United States Patent
Ruf et al.

(10) Patent No.: US 8,778,190 B2
(45) Date of Patent: Jul. 15, 2014

(54) METHOD FOR PROCESSING WASTE WATER LOADED WITH NITROGEN-CONTAINING COMPOUNDS

(75) Inventors: Friedrich Ruf, Tiefenbach-Ast (DE); Gerhard Kummer, Loiching (DE); Manfred Frauenrath, Grosskarolinenfeld (DE); Johannes Lautenschlager, Bad Aibling (DE); Gotz Burgfels, Bad Aibling (DE)

(73) Assignee: Süd-Chemie IP GmbH & Co. KG, München (DE)

( * ) Notice: Subject to any disclaimer, the term of this patent is extended or adjusted under 35 U.S.C. 154(b) by 289 days.

(21) Appl. No.: 13/139,531

(22) PCT Filed: Dec. 15, 2009

(86) PCT No.: PCT/EP2009/067189
§ 371 (c)(1),
(2), (4) Date: Jul. 14, 2011

(87) PCT Pub. No.: WO2010/076195
PCT Pub. Date: Jul. 8, 2010

(65) Prior Publication Data
US 2011/0259826 A1    Oct. 27, 2011

(30) Foreign Application Priority Data
Dec. 15, 2008  (DE) .................... 10 2008 062 299

(51) Int. Cl.
*B01J 39/02* (2006.01)
*B01D 49/00* (2006.01)
*C02F 1/42* (2006.01)
*B01D 15/36* (2006.01)
*B01D 24/46* (2006.01)
*B01D 24/28* (2006.01)
*B01D 24/36* (2006.01)

(52) U.S. Cl.
USPC ............ 210/660; 210/670; 210/691; 210/786

(58) Field of Classification Search
None
See application file for complete search history.

(56) References Cited

U.S. PATENT DOCUMENTS

| | | | |
|---|---|---|---|
| 3,459,501 A * | 8/1969 | Rosinski et al. .............. 423/711 |
| 5,558,851 A * | 9/1996 | Miller .......................... 423/702 |
| 5,632,899 A | 5/1997 | Petrille, III et al. |
| 5,667,694 A | 9/1997 | Cody et al. |
| 6,533,855 B1 * | 3/2003 | Gaynor et al. ........... 106/287.14 |
| 7,244,409 B2 | 7/2007 | Burgfels et al. |
| 2004/0007533 A1 | 1/2004 | Hasegawa et al. |

FOREIGN PATENT DOCUMENTS

DE    4446122    6/1996
(Continued)

OTHER PUBLICATIONS

Klanfar et al. Deposits and mining potential bentonite in Croatia. Rud.-geol.-naft. zb. vol. 24 (2012) 35-39.*
Rozic, et al., "Ammoniacal Nitrogen Removal from Water by Treatment with Clays and Zeolites," Water Research, Elsevier, Amsterdam, NL, vol. 34, No. 14, 1., pp. 3675-3681 (Oct. 2000).

(Continued)

*Primary Examiner* — Katherine Zalasky
(74) *Attorney, Agent, or Firm* — Scott R. Cox (57) ABSTRACT

The invention relates to a method for purifying wastewater loaded with nitrogen-containing compounds, wherein the wastewater loaded with nitrogen-containing compounds is reacted with a smectic sheet silicate, wherein a clay material loaded with nitrogen-containing compounds is obtained, and the clay material loaded with nitrogen-containing compounds is separated off, wherein purified wastewater is obtained.

15 Claims, 1 Drawing Sheet

Relationship between dosage/COD reduction

(56) References Cited

FOREIGN PATENT DOCUMENTS

| | | |
|---|---|---|
| EP | 0474386 | 3/1992 |
| EP | 0504131 | 9/1992 |
| GB | 920797 | 3/1963 |
| JP | 55139830 | 11/1980 |
| JP | S63200805 A | 8/1988 |
| JP | 7024443 | 1/1995 |
| JP | 2004121890 | 4/2004 |
| JP | 2004344808 | 12/2004 |
| WO | 9402418 | 2/1994 |
| WO | 2006082997 | 8/2006 |
| ZA | 9809940 | 6/1999 |

OTHER PUBLICATIONS

English translation of Office Action issued by Japanese Patent Office, dated Nov. 19, 2012, with respect to Japanese Application No. 2011-540145 (Japanese equivalent to instant U.S. application).

English translation of International Preliminary Report on Patentability and accompanying Written Opinion, dated Jun. 21, 2011, with respect to International Application No. PCT/EP2009/067189.

English translation of Office Action issued by Japanese Patent Office, dated Nov. 27, 2013, with respect to Japanese Application No. 2011-540145 (Japanese equivalent to instant U.S. application).

* cited by examiner

METHOD FOR PROCESSING WASTE WATER LOADED WITH NITROGEN-CONTAINING COMPOUNDS

The invention relates to a method for purifying wastewater loaded with nitrogen-containing compounds.

Zeolites are crystalline silicates, the crystal lattices of which are built up from $SiO_4$ and $AlO_4$ tetrahedra which are linked via oxygen bridges. A spatial arrangement of identically constructed cavities which can be accessed via windows or channels which are the same size as one another forms. Such a crystal lattice can equally act as a sieve which takes up molecules with a smaller cross-section than the pore openings into the cavities of the lattice while larger molecules cannot enter. Zeolites are therefore often also called molecular sieves. The cations necessary to compensate the negative charge of the $AlO_4$ tetrahedra in the aluminosilicate skeleton are relatively mobile in the hydrated lattice and can be easily exchanged for other metal ions. Zeolites can therefore also act as ion exchangers.

Zeolites are used in numerous technical applications. A Exemplary applications are in detergents for softening the washing water, as catalysts in chemical reactions or also as separating fluids for gas mixtures, for example in petrochemistry.

When producing zeolites suitable silicon and aluminium compounds are reacted under alkaline conditions. The reaction is carried out mostly at higher temperature optionally under autogenous pressure. The reaction times range from a few hours to several days.

The synthesis of zeolites takes place mostly under hydrothermal conditions. A reactive alkali source, a silicon source and an aluminium source as well as optionally seed crystals are reacted to a gel. This gel is then left to react in an autoclave under autogenous pressure. Sodium water glass or silica gel for example are used as reactive starting materials and aluminium hydroxide or sodium aluminate for example as aluminium source.

Some zeolites form directly from the starting materials. However, in many zeolites, for example MFI zeolite, structure-directing compounds are also added to the reaction mixture in order to support the formation of the desired structure. These templates occupy the position of the pores during crystallization of the zeolite and thus support the formation of the desired crystal structure. Organic cations, generally amines or quaternary ammonium compounds, are mostly used as templates. The template is generally added in excess to the reaction mixture. After synthesis the zeolite is separated off from the mother liquor, washed and calcined, in order to remove the template from the pores of the zeolite.

The mother liquor produced during zeolite synthesis as well as the washing water are strongly alkaline and contain substantial quantities of the template.

Due to their high nitrogen content, the wastewaters produced during zeolite synthesis must firstly be treated before, for example, they can be introduced into a sewage treatment plant with a biological clarification stage or also directly into surface water. The wastewaters, on the other hand, have a marked eutrophicating effect and thus greatly damage the environment. The poor biodegradability of quaternary nitrogen compounds in particular is a problem here.

Various methods for treating such nitrogen-containing wastewaters have already been developed.

Thus for example the wastewaters are burned in incinerators, which means a high energy expenditure and leads to corresponding costs. A further possibility is to concentrate the nitrogen-containing compounds contained in the wastewater. This is possible for example by reverse osmosis or distillation or vaporization. Such systems require high investment with the result that they are worthwhile only when a large amount of such wastewaters is produced. Finally, the mother liquor produced during zeolite synthesis can also be returned directly into the production process.

Thus EP 1 230 157 B1 describes a method for producing synthetic zeolites with an MFI structure, wherein the reaction of the starting products is carried out in the presence of seed crystals which have been obtained from an earlier batch, and without separation from the mother liquor. Thus with this method the mother liquor is re-used for the next synthesis batch. The zeolite crystals separated from the mother liquor are subsequently washed and then calcined. The wastewater produced during washing is not returned into the synthesis process. However, as it still contains relatively large quantities of template as well as salts, this wastewater cannot, for example, be introduced directly into a sewage treatment plant with a biological clarification stage.

Therefore, the object of the invention was to provide a method for purifying wastewater loaded with nitrogen-containing compounds which can also be used at favourable cost with small quantities of wastewater and which makes possible a simple and efficient removal of the nitrogen-containing compounds from the wastewater.

This object is achieved with a method with the features of claim 1. Advantageous embodiments of the method according to the invention are the subject of the dependent claims.

Smectic sheet silicates are used as adsorbents in the method according to the invention. It was found that such smectic sheet silicates in particular adsorb quaternary nitrogen compounds very efficiently from the wastewater, with the result that only small quantities of adsorbent are needed to purify the wastewater to the point where it can at least be fed to a sewage treatment plant with a biological purification stage. The smectic sheet silicates used in the method according to the invention can be separated from the liquid phase relatively easily, for example by filtration, centrifugation or sedimentation. The smectic sheet silicate can be flocculated by the reaction with the nitrogen-containing compound, in particular if this is loaded, with the result that a satisfactorily filterable suspension forms. The method can be carried out with simple means with the result that no special investment in apparatus is required. Essentially, for example a stirred tank is sufficient for reacting the wastewater loaded with nitrogen-containing compounds with the smectic sheet silicate and a filtration device for separating the clay material loaded with nitrogen-containing compounds. The method is suitable both for the treatment of large quantities of loaded wastewater and for the treatment of small quantities of wastewater. The method can therefore for example be used in an industrial-scale zeolite synthesis, wherein special devices for carrying out the method can also be provided here, for example suitably sized stationary filters as well as pumps for transporting the wastewater. It is, however, also possible to use the method according to the invention for treating very small quantities of wastewater, such as are produced for example during a synthesis in the laboratory or semi-scale plant. The chosen outlay on apparatus can be very small here and for example be limited to a beaker with a stirrer as well as a simple paper filter. The method according to the invention can therefore be used very flexibly.

The subject of the invention is therefore a method for purifying wastewater loaded with nitrogen-containing compounds, wherein the wastewater loaded with nitrogen-containing compounds is reacted with a smectic sheet silicate, wherein a clay material loaded with nitrogen-containing compounds is obtained, and the clay material loaded with nitrogen-containing compounds is separated off, wherein purified wastewater is obtained.

With the method according to the invention, firstly wastewater loaded with nitrogen-containing compounds is provided. The wastewater can come from any source. Preferably, however, wastewaters such as are produced during chemical syntheses are purified with the method according to the invention. Such wastewaters may have relatively high concentrations of certain contaminants, for example certain nitrogen-containing compounds. However, such wastewaters often have a relatively constant composition. Particularly preferably, the method is used for purifying wastewater which forms during a specific chemical reaction thus before this wastewater is mixed with a different wastewater which is produced during another chemical reaction and therefore has a different chemical composition. Preferably, the method is used for purifying wastewaters which regularly are produced over extended periods and have an approximately identical composition. Particularly preferably, the method according to the invention is therefore already used at a point in the wastewater stream which is arranged, in process engineering terms, near to the formation of the wastewater, thus before a mixing with wastewater of a different composition has taken place.

The wastewater loaded with nitrogen-containing compounds is then reacted with a smectic sheet silicate. For this, the smectic sheet silicate is then added to the wastewater loaded with nitrogen-containing compounds. The chosen form in which the smectic sheet silicate is added to the wastewater can initially be as desired. The smectic sheet silicate can be provided stationary, for example in the form of a filter layer or a packing over which the wastewater flow is then passed. In this embodiment, the smectic sheet silicate should preferably have no, or only a small, swelling capacity, as otherwise the filter layer or the packing swells and thus readily becomes clogged, with the result that a filtrate can barely, if at all, pass through the layer formed by the sheet silicate.

Preferably, the smectic sheet silicate is suspended in the wastewater loaded with nitrogen-containing compounds. Preferably, in this embodiment of the method, the suspension is moved during the reaction, for example by means of a stirrer. The reaction is preferably carried out at room temperature. It is thus not necessary for example to heat the suspension of the smectic sheet silicate in order to achieve a quicker or more efficient reaction. Preferably, the chosen temperature of the wastewater during reaction is less than 60° C., preferably less than 50° C. According to an embodiment the chosen temperature of the wastewater is more than 10° C., preferably more than 15° C. Likewise, the reaction is preferably carried out at ambient pressure.

The progress of the reaction can optionally be tracked by taking samples. Preferably, the reaction is carried out until at least 80%, preferably at least 90%, particularly preferably at least 95% of the nitrogen-containing compound contained in the wastewater are bound by the smectic sheet silicate. The suitable quantity of smectic sheet silicate can optionally be ascertained by preliminary tests. Further metered doses of smectic sheet silicate can optionally be added during the reaction.

The COD value may be used as indicator of the removal of the nitrogen-containing compounds from the wastewater. Typical COD values such as are ascertained for example in the mother liquors from the zeolite synthesis lie in the range of from more than 150,000 mg/l $O_2$. The COD value of a washing water such as is produced for example during zeolite synthesis, lies in the range of from 2,000 to 10,000 mg/l $O_2$, wherein the progress of the washing process or the quantity of washing water used must be taken into account here. In order to be able to introduce wastewater contaminated with nitrogen-containing compounds into a sewage treatment plant with a biological purification stage, the COD value should be reduced to below 800 mg/l $O_2$. This requirement can be met by the method according to the invention. According to an embodiment the COD value of the wastewater is therefore reduced to less than 800 mg/l $O_2$ with the method according to the invention. The purified wastewater can then for example be fed to a sewage treatment plant with a biological purification stage.

The clay material loaded with nitrogen-containing compounds is then separated off. Usual methods can be used for this. For example, the clay material can sediment and the supernatant aqueous phase be decanted off. It is, however, also possible, for example, to separate off the clay material by centrifuging and decanting off the aqueous phase. The clay material is preferably separated off by filtration. The devices used for separation are chosen depending on the quantity of wastewater to be treated. For small quantities the separation is possible, for example, with the help of a folded filter, while for example pressure filters can also be used for larger quantities.

After separating off the clay material loaded with nitrogen-containing compounds purified wastewater is obtained which is then for example fed to a sewage treatment plant, such as a sewage treatment plant with a biological clarification stage or, if no further environment-loading substances are contained in the purified wastewater, can also be directly introduced into surface water. The purified wastewater preferably has a pH of less than 10. According to an embodiment the purified wastewater has a pH of more than 5, according to a further embodiment of more than 6.

It was found that the smectic sheet silicate has a very high affinity to nitrogen compounds, in particular quaternary nitrogen compounds, and therefore makes possible a very efficient purification of wastewaters loaded with nitrogen-containing compounds.

As already stated, the method according to the invention is suitable in particular for purifying wastewaters loaded with nitrogen-containing compounds, such as are produced for example during chemical reactions.

According to a preferred embodiment the method according to the invention is used to separate off quaternary alkyl ammonium compounds from the wastewater. Such quaternary ammonium compounds are for example used as templates in zeolite syntheses. The chosen structure of the quaternary ammonium compound can be as desired, wherein the alkyl groups bound to the nitrogen can be identical or different. Thus both quaternary ammonium compounds which carry only one type of an alkyl group and consequently have the structural formula $NR^1_4X$, and also quaternary ammonium compounds which carry two, three or four different alkyl groups, thus have a structural formula $NR_1R^2R^3R^4X$, can be removed, wherein two or three of the radicals $R^1$, $R^2$, $R^3$, $R^4$ can also be the same. The radicals $R^1$, $R^2$, $R^3$, $R^4$ can each be alkyl radicals with 1 to 10 carbon atoms and be straight-chained or branched. Any desired anion $X^-$ of the quaternary ammonium compound can be chosen per se. The anion of the quaternary ammonium compounds is preferably selected from the group of $Cl^-$, $Br^-$, and $OH^-$.

In particular hydrophilic alkyl ammonium compounds can also be removed from the wastewater with the method according to the invention. According to a preferred embodiment the quaternary ammonium compound therefore carries alkyl groups which have a carbon count of less than 6. It is known that smectic sheet silicates can be reacted with ammonium compounds with the result that for example organophilic bentonites are obtained. However, the ammonium compounds used for this however carry long-chained alkyl radicals. The corresponding ammonium compounds therefore have clearly hydrophobic properties. In order to be able to transform such hydrophobic ammonium compounds into a solution, solvents which are more non-polar than water, for example mixtures of water and alcohols, such as ethanol must therefore be used. Hydrophilic ammonium compounds can also be removed from an aqueous phase with the method according to the invention. This also takes place in the presence of larger quantities of other ions, such as alkali metal ions or aluminates, such as are typically contained in wastewaters, such as is produced during the synthesis of zeolites. Particularly preferably, the alkyl groups of the quaternary ammonium compounds which are to be removed from the wastewater with the method according to the invention have a carbon count between 1 and 4. Preferably, the alkyl radicals $R^1$, $R^2$, $R^3$, $R^4$ are selected from the group of methyl, ethyl, propyl and butyl. A quaternary ammonium compound which is used during the synthesis of zeolites, is tetrapropyl ammonium compounds, for example tetrapropyl ammonium bromide.

It is advantageous, when carrying out the method according to the invention in practice, if over-large quantities of smectic sheet silicate are not reacted with the wastewater loaded with nitrogen-containing compounds. Otherwise, with very large quantities of added smectic sheet silicate, i.e. with very large quantities of nitrogen-containing compounds in the wastewater, a highly viscous suspension or a slurry which can no longer be easily processed is obtained. The use of very large quantities of smectic sheet silicate to purify a given quantity of wastewater is thus more likely to be less advantageous in terms of economics.

According to an embodiment the method is preferably used to purify wastewaters which are not disproportionately loaded with nitrogen-containing compounds. An example of such a less-loaded wastewater is a wastewater which is produced when washing zeolite crystals after these have been separated from the mother liquor during zeolite synthesis.

According to an embodiment the method is suitable for purifying wastewater loaded with nitrogen-containing compounds, wherein the level mount of nitrogen-containing compound in the loaded wastewater is less than 5000 mg/l N, according to a further embodiment less than 800 mg/l N and according to a further embodiment less than 100 mg/l N. According to an embodiment the level of nitrogen-containing compound in the wastewater is more than 10 ppm, according to a further embodiment more than 20 ppm. The concentration values given relate to atomic nitrogen.

As already mentioned, it was found that nitrogen-containing compounds can also be removed using the method according to the invention from wastewater which contains larger quantities of other ions, in particular metal ions. Such wastewater is represented in particular by a washing water such as is produced during the washing of zeolite crystals in the course of a zeolite synthesis.

According to an embodiment the wastewater loaded with nitrogen-containing compounds has a concentration of alkali metal ions, in particular sodium ions or potassium ions, which is less than 15000 mg/l $X^+$, preferably less than 2000 mg/l $X^+$, particularly preferably less than 500 mg/l $X^+$, wherein $X^+$ stands for sodium or potassium, in particular sodium ions. According to an embodiment the concentration of alkali metal ions in the wastewater loaded with nitrogen-containing compounds is more than 10 mg/l $X^+$, according to a further embodiment more than 100 mg/l $X^+$.

According to a further embodiment the concentration of aluminium ions contained in the wastewater loaded with nitrogen-containing compounds is less than 15 mg/l $Al^{3+}$, according to a further embodiment less than 10 mg/l $Al^{3+}$, according to a further embodiment less than 1 mg/l $Al^{3+}$. According to an embodiment the concentration of aluminium ions contained in the wastewater loaded with nitrogen-containing compounds, calculated as $Al^{3+}$, is more than 100 µg/l, according to a further embodiment more than 250 µg/l.

According to an embodiment the method according to the invention is suitable in particular for treating wastewater loaded with nitrogen-containing compounds such as is obtained during synthesis of a zeolite.

The wastewater loaded with nitrogen-containing compounds can comprise both mother liquors and washing water which is produced for example during the purification of the zeolite after synthesis and is for example loaded with nitrogen-containing templates. In particular the method is used for purifying a washing water such as is produced during the synthesis of a zeolite if the zeolite crystals are washed after separation from the mother liquor.

The synthesis of the zeolites can have been carried out per se in any way desired. Generally a silicon source and an aluminium source as well as an organic template, in particular a nitrogen-containing organic template, are reacted with one another under preferably hydrothermal conditions. A suitable silicon source is for example precipitated silica. A suitable aluminium source is for example sodium aluminate. However, other silicon or aluminium sources can also be used.

If the synthesis of the zeolite is carried out under hydrothermal conditions the temperature is preferably in the range of from 100 to 180° C.

The synthesis of the zeolite is preferably carried out under alkaline conditions. The pH of the aqueous gel, which is essentially produced from the silicon source, the aluminium source and the template, lies preferably in the alkaline, preferably in the range of from 11 to 13. The wastewater produced during synthesis of the zeolite therefore preferably likewise has an alkaline pH.

Any further customary components can optionally be added to the gel. Thus the gel can for example also contain seed crystals which facilitate the formation of the desired zeolite structure.

The levels of the silicon source and the aluminium source are chosen depending on the composition of the zeolite to be synthesized. According to an embodiment the chosen Si/Al atomic ratio is more than 8. According to an embodiment the chosen Si/Al atomic ratio is between 10 and 100, according to a further embodiment between 12 and 50. The wastewater produced during synthesis can therefore also still contain further levels for example of the aluminium source and/or the silicon source or also sodium hydroxide.

The wastewater preferably contains water as solvent, to which other solvents for example alcohols such as ethanol, can however also be added. The wastewater preferably contains essentially water as solvent. The level of non-aqueous solvent in the wastewater loaded with nitrogen-containing compounds is preferably less than 5 wt.-%, more preferably less than 1 wt.-%.

After reaction, the zeolite is treated in the customary manner. Firstly, the zeolite crystals that have formed are separated off from the mother liquor with customary methods. The mother liquor can optionally be re-used or completely or partially processed according to the method according to the invention. Preferably, the mother liquor is returned into the synthesis process and used as a further batch for zeolite synthesis.

The zeolite crystals can then be washed in order to be freed of still-adhering mother liquor. The washing step can also be repeated several times. The washing water can then likewise be treated with the method according to the invention, optionally together with the mother liquor from the zeolite synthesis. The different fractions of washing water which is produced during washing of the zeolite crystals are preferably combined and the concentration of the nitrogen-containing compounds contained within reduced by the method according to the invention.

After washing the zeolite is further processed in customary manner and for example dried and calcined.

With the method according to the invention, a smectic sheet silicate is used as adsorbent for the nitrogen-containing compounds. The smectic sheet silicate is a three-layer mineral which is built up from octahedral layers which are surrounded on both sides by tetrahedral layers. Exchangeable interlayer cations are embedded between these negatively charged layers. The ion exchange capacity of the smectic sheet silicate used in the method according to the invention lies preferably in the range of from 60 to 200 meq/100 g, preferably 70 to 120 meq/100 g and particularly preferably in the range of from 75 to 100 meq/100 g.

Neutral or alkaline activated smectic sheet silicates are preferably used in the method according to the invention. By a neutral smectic sheet silicate is meant a smectic sheet silicate in which a suspension of 2 g/10 ml in water has a pH in the range of from 6 to 8, preferably 6.5 to 7.5. By an alkaline activated smectic sheet silicates is meant a smectic sheet silicate in which a suspension of the smectic sheet silicate of 2 g/10 ml in water has a pH of more than 8, preferably in the range of from 9 to 12. Alkaline activated smectic sheet silicates are obtained by reacting a smectic sheet silicate with a base, preferably an alkali metal base, particularly preferably sodium carbonate. For this the smectic sheet silicate can be reacted with a, preferably aqueous, solution of the base. Preferably, the smectic sheet silicate is kneaded with the dry base, in particular sodium carbonate. The chosen quantity of the base is preferably such that it corresponds to at least 60%, preferably at least 80%, of the ion exchange capacity of the smectic sheet silicate.

According to an embodiment preferably smectic sheet silicates which have a high level of exchangeable alkali metal ions, in particular sodium ions, are used with the method according to the invention. According to an embodiment at least 50 preferably at least 75% of the cation exchange capacity of the smectic sheet silicate is formed from alkali metal ions.

Preferably, basic-activated sheet silicates which are only slightly activated are used. Preferably, the chosen quantity of base, in particular sodium carbonate, is therefore lower than 160%, further preferably less than 140% of the ion exchange capacity of the smectic sheet silicate. Preferably, in the method according to the invention, a smectic sheet silicate which has a content of sodium ions extractable with ammonium ions which is between 80 and 140%, preferably between 90 and 130% of the ion exchange capacity of the smectic sheet silicate is used.

According to a further embodiment smectic sheet silicates which have an average ion exchange capacity are used. Preferably, in the method according to the invention, smectic sheet silicates which have an ion exchange capacity of from 40 to 85 meq/100 g, further preferably 50 to 75 meq/100 g are used.

It was further found that it is advantageous if the smectic sheet silicate used in the method according to the invention does not swell too strongly. In particular, very highly activated smectic sheet silicates delaminate almost completely in water. Firstly, this can lead to a marked increase in the viscosity of the wastewater. Secondly, such a markedly delaminated smectic sheet silicate can be separated again from the purified wastewater only with difficulty. Preferably, therefore, a smectic sheet silicate which has a swelling capacity in water in the range of from 15 to 40 ml/2 g, further preferably in the range of from 20 to 35 ml/2 g is used in the method according to the invention.

Without wishing to be bound by this theory, the inventors assume that aggregates which comprise a larger number of layers are still present in a suspension of a delaminated smectic sheet silicate which has a swelling capacity in the above-described preferred range. If these layered stacks react with the nitrogen-containing compound contained in the wastewater, microflakes form which can then be easily separated off from the aqueous phase by, for example, filtration.

Smectic sheet silicates the chosen specific surface area of which is between 30 and 100 $m^2/g$, preferably between 40 to 70 $m^2/g$, are preferably used in the method according to the invention. The specific surface area is determined using the BET method according to DIN 66131.

Bentonite, preferably a bentonite with a high montmorillonite content, is preferably used as smectic sheet silicate. The montmorillonite content of the smectic sheet silicate is preferably more than 60 wt.-%, for preference more than 70 wt.-%. The quoted values relate to an anhydrous bentonite. A method for determining the montmorillonite content is given in the examples.

The smectic sheet silicate is then added to the wastewater loaded with nitrogen-containing compounds. The quantity of smectic sheet silicate depends on the quantity of nitrogen-containing compounds contained in the wastewater. The required quantity can optionally be ascertained by suitable preliminary tests. However, the chosen quantity of smectic sheet silicate used can per se be very small. According to an embodiment the smectic sheet silicate is added to the wastewater loaded with nitrogen-containing compounds in a quantity of more than 1 g/100 ml, preferably more than 1.5 g/ml, preferably more than 2 g/ml. According to an embodiment the chosen quantity of the smectic sheet silicate added to the wastewater loaded with nitrogen-containing compounds is less than 20 g/100 ml, according to a further embodiment less than 10 g/100 ml.

As already explained, the smectic sheet silicate can per se be brought into contact in any chosen way with the wastewater loaded with nitrogen-containing compounds. Thus the smectic sheet silicate can for example be provided stationary in the form of a filter packing or a column over which the wastewater loaded with nitrogen-containing compounds that is to be purified is then passed. Such an embodiment is for example suitable for smectic sheet silicates which have a very low swelling capacity.

According to an embodiment it is provided that the smectic sheet silicate is added in the form of a powder or granular material to the wastewater loaded with nitrogen-containing compounds. The powder or granular material can thus be added dry to the wastewater loaded with nitrogen-containing compounds and for example be stirred into same.

The powder or the granular material preferably has an average particle size $D_{50}$ of less than 1 mm, preferably less than 0.5 mm. According to an embodiment the particle size of the powder or granular material is chosen to be more than 50 µm, according to a further embodiment more than 100 µm.

The average particle size $D_{50}$ can be ascertained for example by sieve analysis.

According to an embodiment the smectic sheet silicate is provided in the form of a suspension in water and the suspension then added to the wastewater loaded with nitrogen-containing compounds. It has been shown that the removal of the nitrogen-containing compounds, in particular ammonium compounds, proceeds more efficiently if the smectic sheet silicate is added to the water in the form of a suspension. Without wishing to be bound by this theory, the inventors assume that the smectic sheet silicate is firstly pre-swollen in water and thereby the nitrogen-containing compound, in particular ammonium compound, is taken up more easily by the smectic sheet silicate. Preferably water is used as liquid phase in which the smectic sheet silicate is suspended. Pure water is preferably used. Further solvents can, however, still be added to the water. For example it is possible to use mixtures of water and alcohol. Exemplary alcohols are ethanol and propanol. Further solvents are used in addition to water, according to an embodiment their chosen level is less than 20 wt.-%, according to a further embodiment less than 10 wt.-% and according to a further embodiment less than 5 wt.-%.

The suspension of the smectic sheet silicate which is added to the wastewater preferably has a solids content of from 2.5 to 20 g/l, according to a further embodiment a solids content of from 5 to 15 g/l.

The granular material per se may have been produced in any desired manner and with customary methods.

The reaction of the smectic sheet silicate with the nitrogen-containing compound proceeds relatively rapidly, with the result that short treatment times are possible. The treatment time thus depends on the quantity or the concentration of the nitrogen-containing compound contained in the wastewater as well as on the quantity of the smectic sheet silicate used. According to an embodiment a treatment time of less than 30 minutes, according to an embodiment a treatment time of less than 10 minutes, is chosen for the reaction of the smectic sheet silicate with the wastewater loaded with nitrogen-containing compounds. According to an embodiment the chosen treatment time is longer than 30 seconds, according to a further embodiment longer than 1 minute.

The method according to the invention makes possible an efficient removal of nitrogen-containing compounds from loaded wastewater. The method according to the invention is preferably carried out such that the purified wastewater contains less than 800 ppm, preferably less than 600 ppm, according to a further embodiment less than 500 ppm and according to a further embodiment less than 400 ppm, of the nitrogen-containing compound. The quoted figures relate to the weight and are calculated on the basis of ammonium hydroxide ($NH_4OH$).

The clay material loaded with the nitrogen-containing compound, that has been separated off from the purified wastewater, can be treated in suitable manner and for example burned.

The templates used during the synthesis of zeolites are, however, relatively expensive, with the result that, according to a further embodiment of the method according to the invention, the nitrogen-containing compound is recovered from the clay material loaded with nitrogen-containing compounds. For this, the nitrogen-containing compound can, for example, be expelled from the clay material, for example by a suitably highly-concentrated solution of an alkali metal salt. According to an embodiment, a solution of an alkali metal salt which has a concentration preferably in the range of from 1 to 10 g/l, is suitable to be used for this. Suitable alkali metal salts are for example $NaCl$, $NaSO_4$, $Na_3PO_4$. However, it is for example also possible to elute the nitrogen-containing compound bound to the smectic sheet silicate with the help of an acid.

Suitable acids are for example sulphuric acid or hydrochloric acid. A suitable concentration of the acid can for example be ascertained in the preliminary tests. However, it is also possible to use an elution gradient. The method according to the invention is explained in more detail below using examples with reference to the enclosed FIGURE. There is shown in:

DETERMINATION METHODS

BET Surface Area/Pore Volume According to BJH and BET:

The surface area and the pore volume were determined with a fully automatic Micromeritics ASAP 2010 type nitrogen porosimeter.

The sample is cooled in high vacuum to the temperature of liquid nitrogen. Nitrogen is then continuously introduced in metered doses into the sample chamber. An adsorption isotherm is calculated at constant temperature by ascertaining the adsorbed quantity of gas as a function of the pressure. After a pressure equalization the analysis gas is progressively removed and a desorption isotherm recorded.

To ascertain the specific surface area and the porosity according to the BET theory, the data are evaluated according to DIN 66131.

The pore volume is furthermore calculated from the measurement data applying the BJH method (E. P. Barret, L. G. Joiner, P. P. Haienda, J. Am. Chem. Soc. 73 (1951, 373). Capillary condensation effects are also taken into account with this method. Pore volumes of specific pore size ranges are determined by totalling incremental pore volumes obtained from the evaluation of the adsorption isotherm according to BJH. The total pore volume according to the BJH method relates to pores with a diameter of from 1.7 to 300 nm.

Ion Exchange Capacity:

To determine the cation exchange capacity, the clay material to be examined is dried over a period of 2 hours at 105° C. The dried clay material is then reacted with an excess of aqueous 2N $NH_4Cl$ solution for 1 hour accompanied by reflux. After a standing time of 16 hours at room temperature, the mixture is filtered, whereupon the filter cake is washed, dried and ground and the $NH_4$ content in the clay material is ascertained by nitrogen determination ("Vario EL III" CHN analyzer from Elementar, Hanau) in accordance with the manufacturer's instructions. The proportion and type of the exchanged metal ions are determined in the filtrate by ICP spectroscopy.

Determining the Montmorillonite Content Via Methylene Blue Adsorption

The methylene blue value is a measure of the internal surface area of the clay materials.

a) Producing a Tetrasodium Diphosphate Solution 5.41 g tetrasodium diphosphate is weighed out accurate to within 0.001 g into a 1000-ml measuring flask and, accompanied by shaking, made up to the calibration mark with dist. water.

b) Producing a 0.5% Methylene Blue Solution 125 g methylene blue is dissolved in approx. 1500 ml dist. water in a 2000-ml beaker. The solution is decanted and made up to 25 l with dist. water.

0.5 g moist test-grade bentonite with a known internal surface area is weighed in accurate to within 0.001 g in an Erlenmeyer flask. 50 ml tetrasodium diphosphate solution is added and the mixture is heated to boiling for 5 minutes. After cooling to room temperature, 10 ml 0.5 molar H₂SO₄ is added and 80 to 95% of the expected final consumption of methylene blue solution is added. A drop of the suspension is taken up with the glass rod and placed on a filter paper. A blue-black stain with a colourless corona forms. Further 1 ml portions of methylene blue solution are now added and the spot test repeated. Solution continues to be added until the corona turns slightly light blue, i.e. the added quantity of methylene blue is no longer absorbed by the test bentonite.

c) Testing of Clay Materials

The procedure for testing the clay material is the same as for the test bentonite. The internal surface area of the clay material can be calculated from the consumed quantity of methylene blue solution.

381 mg methylene blue/g clay corresponds according to this method to a 100% montmorillonite content.

Determining the Bulk Density

A measuring cylinder cut off at the 1000-ml mark is weighed. The sample to be examined is then poured, by means of a powder funnel, into the measuring cylinder in one go such that a wedge-shaped bulk material forms above the end of the measuring cylinder. The bulk mass is wiped off with the help of a ruler which is passed across the opening of the measuring cylinder, and the filled measuring cylinder weighed again. The difference corresponds to the bulk density.

Determining the pH

The pH was determined with the help of a calibrated glass electrode in a suspension of the clay material of 10 g/100 ml.

Determining the Swelling Volume

A graduated 100-ml measuring cylinder is filled with 100 ml distilled water or an aqueous solution of 1% soda and 2% trisodium polyphosphate. 2 g of the substance to be measured is slowly and portionwise, approximately 0.1 to 0.2 g at a time, placed on the surface of the water with a spatula. After an added portion has sunk the next portion is added. After the 2 g of substance has been added and fallen to the bottom of the measuring cylinder the cylinder is left to stand for one hour at room temperature. The level of the swollen substance is then read off in ml/2 g using the scale on the measuring cylinder Determining the Tetrapropyl Ammonium Bromide Content The tetrapropyl ammonium bromide content is gravimetrically determined with sodium tetraphenyl borate in a concentration range of from 0.5 to 50 wt.-%.

0.1 to 10 g of the analysis solution is weighed in accurately into a beaker, 20 ml double-distilled water is added and the whole heated to 50° C. 10 ml of a solution of 2 wt.-% sodium tetraphenyl borate in double-distilled water is added slowly accompanied by stirring. After the addition, the sample is left to stand for a further 15 minutes. The precipitate is filtered off via a previously weighed G4 filter crucible and washed twice with the filtrate. The filter cake is washed with double-distilled water and then dried to constant weight at 120° C. The crucible is weighed again and the weight of the precipitate determined from the difference.

Determining the COD Value

The determination takes place according to DIN ISO 15705 at 148° C. with a commercially available "NANO-COLOR CSB 1500" test kit from Macherey-Nagel GmbH & Co. KG, Düren, DE. Details of the method are published on the webpage (http://www.mn-net.com) and described below.

Method: Photometric determining of the chromium(III) concentration after oxidation with potassium dichromate/sulphuric acid/silver sulphate.
Range: 100-1500 mg/l COD
Factor: 1740
Wavelength (HW=5-12 nm): 620 nm
Reaction time: 2 h
Reaction temperature: 148° C.
Short time COD: 30 min at 160° C.

Equipment required: NANOCOLOR® Thermoblock, piston pipette with tips.

A test tube is taken from the test kit and opened. The contents of the test tube are slowly coated with 2.0 ml sample solution. The test tube is screwed tight, placed inside a safety vessel, shaken and placed into the Thermoblock. The test tube is heated for 2 hours to 148° C. The test tube is then removed from the Thermoblock, shaken once more after approx. 10 min (still warm) and then cooled to room temperature. The test tube is cleaned on the outside, placed into the measuring equipment and the extinction at 620 nm determined.

The smectic sheet silicates listed in Table 1 were used for the examples.

TABLE 1

Smectic sheet silicates used for purification tests

| Clay 1 | Natural Na bentonite Wyoming Bentonite | Ceratosil |
| Clay 2 | Natural, Turkish, calcium bentonite highly activated with approx. 5 wt.-% Na₂CO₃ | Opazil |
| Clay 3 | Natural, Turkish, non activated calcium bentonite | Printosil |
| Clay 4 | Turkish, non activated bentonite | Tonsil |
| Clay 5 | Bavarian calcium bentonite activated with approx. 3 wt.-% Na₂CO₃ | Südflock P |

The properties of the sheet silicates are listed in Table 2.

TABLE 1

Properties of the smectic sheet silicates used for purification tests

| Clay | pH | Swelling volume (ml/2 g) | Ion exchange capacity (IAC) (meq/100 g) | Level of Na ions in the IAC (%) | Specific surface area (m²/g) | Mont. content (%) |
|---|---|---|---|---|---|---|
| Clay 1 | 8.5 | 35 | 71 | 57 | 60 | 85 |
| Clay 2 | 10.5 | 50 | 103 | 58 | 65 | 100 |
| Clay 3 | 8.2 | 6 | 57 | 10 | 85 | 72 |
| Clay 4 | 7.3 | 2 | 44 | 8 | 250 | 35 |
| Clay 5 | 9.5 | 28 | 60 | 45 | 68 | 75 |

EXAMPLE 1

Purifying a Washing Water by Adding Different Smectic Sheet Silicates in Dry Form To carry out the tests, in each case 100 ml of a washing water which was produced during an industrial-scale synthesis of an MFI zeolite was used. The washing water had a pH of 11 and contained 0.19 wt.-% tetrapropyl ammonium bromide and had a COD value of 4400 mg O₂/l. The sodium content of the washing water was 478 mg/l Na, the aluminium content was less than 1 mg/l Al.

The washing water was placed inside a 250-ml Erlenmeyer flask and stirred at approx. 930 rpm at room temperature with a stirring bar. For one minute the smectic sheet silicate to be tested was added in each case in the form of a dry granular material and the suspension then stirred for a further 10 minutes at approx. 930 rpm. The suspension was filtered via a membrane filter with a pore size of 0.2 mm and the pH, the tetrapropyl ammonium bromide (TPABr) content as well as the COD value of the filtrate was determined. The ascertained values are given in Table 3.

A clear reduction in the concentration of tetrapropyl ammonium bromide in the wastewater, and as a consequence also a clear fall in the COD value, was observed with all added smectic sheet silicates.

The best results are achieved with clay 1 which has an average ion exchange capacity and an average swelling capacity.

Surprisingly, a clearly worse cleaning effect was achieved with the highly activated claim 2, which has a high sodium content and a high swelling capacity, than with the less highly activated clay 1.

Similarly, clay 3, a calcium bentonite which has a low sodium content and thus a low swelling capacity, has a lower purification effect than clay 1.

TABLE 3

Depletion of TPABr in a washing water using different smectic sheet silicates

| Clay | Quantity added (g, ab. dry) | TPABr (%) | pH | COD (mg $O_2$/l) |
|---|---|---|---|---|
| — | — | 0.19 | 11 | 4400 |
| 1 | 2.5 | <0.01 | 10.4 | 112 |
| 1 | 5 | <0.01 | 10.3 | 120 |
| 1 | 10 | <0.01 | 9.8 | 118 |
| 2 | 5 | 0.07 | 10.4 | >1500 |
| 2 | 10 | 0.04 | 10 | 867 |
| 3 | 5 | 0.02 | 9.6 | 637 |
| 3 | 10 | 0.02 | 9.7 | 576 |
| 4 | 5 | 0.06 | 9.4 | 1420 |
| 4 | 10 | 0.05 | 9.15 | 1280 |

EXAMPLE 2

Purifying a Washing Water by Adding Different Smectic Sheet Silicates in the Form of an Aqueous Suspension Example 1 was repeated except that the smectic sheet silicate was added in the form of an aqueous suspension. The suspension was produced by suspending the relevant smectic sheet silicate in distilled water at room temperature and then stirring it for 20 minutes. The suspension was then added to the washing water to be purified. The results are contained in Table 4.

The solids content, to be added to the washing water to be purified, of the suspension is given in Table 4, as well as the absolute quantity of the smectic sheet silicate added ("ab. dry": absolutely dry).

TABLE 4

Depletion of TPABr in a washing water using suspensions of a different smectic sheet silicate

| Clay | Solids content (wt.-%) | Quantity (g, ab. dry) | TPABr (%) | pH | COD (mg $O_2$/l) |
|---|---|---|---|---|---|
| — | — | — | 0.19 | 11 | 4400 |
| 1 | 7.1 | 2.5 | 0.01 | 9.8 | 102 |
| 1 | 7.1 | 5 | 0.01 | 9.1 | 76 |
| 1 | 7.1 | 10 | <0.01 | 9.1 | 80 |
| 2 | 3.5 | 5 | <0.01 | 9.8 | 367 |
| 2 | 3.5 | 10 | <0.01 | 9.8 | 338 |
| 3 | 19.6 | 5 | 0.02 | 9.7 | 727 |
| 3 | 19.6 | 10 | 0.02 | 9.4 | 437 |
| 4 | 7.0 | 5 | 0.05 | 9.65 | 1164 |
| 4 | 7.0 | 10 | 0.04 | 8.9 | 660 |

If the smectic sheet silicate is initially suspended in water before being added to the washing water to be purified, a better purification effect is achieved in comparison with the addition as dry powder.

EXAMPLE 3

Influence of the Dosage of the Smectic Sheet Silicate on the Purification Effect Analogously to Example 1, in each case 100 ml of a washing water, such as is produced during the synthesis of an MFI zeolite is added, within one minute, to different quantities of clay 5 (water content: 8.25 wt.-%). The quantity of the smectic sheet silicate used, as well as the COD values ascertained for the filtrate, are given in Table 5.

TABLE 5

COD values for a nitrogen-loaded washing water treated with different quantities of clay 5

| Quantity (g) | Stirring time (min) | pH | COD value (mg $O_2$/l) | COD reduction (%) |
|---|---|---|---|---|
| 0 | — | 10.52 | 2616 | |
| 1 | 10 | 10.27 | 867 | 66.86 |
| 2.5 | 10 | 10.00 | 233 | 91.09 |
| 5 | 10 | 9.79 | 88.2 | 96.63 |
| 7 | 10 | 9.53 | 67.9 | 97.40 |
| 10 | 10 | 9.34 | 64.1 | 97.55 |
| 15 | 10 | 9.08 | 57.9 | 97.79 |
| 20 | 10 | 8.81 | 55.4 | 97.88 |

Figure 1:
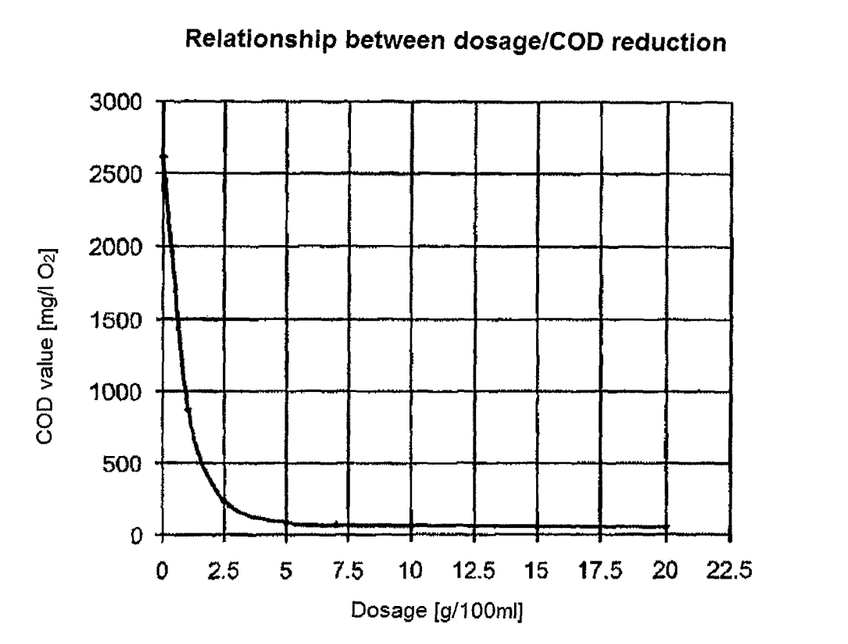
FIG. 1: A graph in which the quantity of smectic sheet silicate used for the purification of wastewater is plotted against the COD value.

The COD values ascertained during the series of tests are graphically reproduced in FIG. 1 in the form of a curve. With only a small dosage, a clear reduction of the COD value is already achieved which, with an increasing quantity of smectic sheet silicate, approaches a low constant level.

EXAMPLE 4

Comparison of Different Stirring Times and Dosage Quantities

Analogously to Example 3, in each case 100 ml of a washing water from an industrial-scale synthesis of an MFI zeolite is stirred, within one minute, into the quantity of clay 6 given in Table 6. The suspension was then further stirred for the period given in Table 6 and the suspension then filtered over a folded paper filter. In each case, the pH and the COD value were determined for the filtrate. The data are listed in Table 6:

TABLE 6

Comparison of different stirring times and dosage quantities during a purification of a washing water with clay 5

| Quantity (g) | Stirring time (min) | pH filtrate | COD filtrate |
|---|---|---|---|
| 1 | 10 | 10.07 | 845 |
| 2.5 | 10 | 9.8 | 223 |
| 1 | 10 | 9.57 | 81 |
| 2.5 | 30 | 9.7 | 222 |

The COD value can be clearly reduced with only short treatment times. If the treatment time is increased, with a given quantity of smectic sheet silicate, the COD value can be further reduced.

The invention claimed is:

1. Method for purifying wastewater loaded with nitrogen-containing compounds to obtain purified wastewater, wherein the method comprises:
   reacting the wastewater loaded with nitrogen-containing compounds with a smectic sheet silicate to obtain a clay material loaded with nitrogen-containing compounds, and
   separating the clay material loaded with nitrogen-containing compounds from the loaded wastewater to produce a purified wastewater
   wherein the nitrogen-containing compounds comprise a quaternary alkyl ammonium compound,
   wherein the smectic sheet silicate has an ion exchange capacity of from 40 to 85 meq/100 g, and
   wherein the smectic sheet silicate has a swelling capacity in the range of from 20 to 40 ml/2g.

2. Method according to claim 1, wherein the quaternary alkyl ammonium compound carries alkyl groups which have a carbon count of less than 6.

3. Method according to claim 1, wherein the level of the nitrogen-containing compounds in the wastewater loaded with nitrogen-containing compounds is less than 5000 mg/1 N.

4. Method according to claim 1, wherein the wastewater loaded with nitrogen-containing compounds has a concentration of alkali ions of less than 15000 mg/1 $X^+$, wherein $X^+$ is an alkali metal ion.

5. Method according to claim 1, wherein the wastewater loaded with nitrogen-containing compounds has a concentration of $Al^{3+}$ ions of less than 15 mg/1 $Al^{3+}$.

6. Method according to claim 1, wherein the loaded wastewater has a pH of more than 10.

7. Method according to claim 1, wherein the method further comprises obtaining the wastewater loaded with nitrogen-containing compounds from a synthesis of a zeolite.

8. Method according to claim 1, wherein the smectic sheet silicate comprises a neutral or an alkali-activated smectic sheet silicate.

9. Method according to claim 1, wherein the smectic sheet silicate has a level of sodium ions extractable with ammonium ions which is between 80 and 140% of the ion exchange capacity of the smectic sheet silicate.

10. Method according to claim 1, wherein the smectic sheet silicate reacted with the wastewater loaded with nitrogen-containing compounds is added in a quantity of more than 1 g/100 ml.

11. Method according to claim 1, wherein the smectic sheet silicate added to the wastewater loaded with nitrogen-containing compounds is in the form of a suspension.

12. Method according to claim 11, wherein the suspension has a solids content from 2.5 to 20 wt.-%.

13. Method according to claim 1, wherein the purified wastewater comprises less than 800 ppm nitrogen-containing compounds.

14. Method according to claim 1, wherein the smectic sheet silicate is reacted with the wastewater loaded with nitrogen-containing compounds for less than 10 minutes.

15. Method for recovering nitrogen-containing compounds from a wastewater containing nitrogen-containing compounds comprising:
   producing the clay material loaded with the nitrogen-containing compounds by carrying out the method according to claim 1, and
   recovering the nitrogen-containing compound from the clay material loaded with the nitrogen-containing compounds by a process selected from the group consisting of expelling the nitrogen-containing compound from the clay material with a solution of an alkali metal salt, eluting with an acid and using an elution gradient.

* * * * *